(12) United States Patent
Kelkar

(10) Patent No.: US 6,654,763 B2
(45) Date of Patent: Nov. 25, 2003

(54) SELECTING A FUNCTION FOR USE IN DETECTING AN EXCEPTION IN MULTIDIMENSIONAL DATA

(75) Inventor: Bhooshan Prafulla Kelkar, Fremont, CA (US)

(73) Assignee: International Business Machines Corporation, Armonk, NY (US)

(*) Notice: Subject to any disclaimer, the term of this patent is extended or adjusted under 35 U.S.C. 154(b) by 223 days.

(21) Appl. No.: 09/881,640

(22) Filed: Jun. 14, 2001

(65) Prior Publication Data
US 2003/0014417 A1 Jan. 16, 2003

(51) Int. Cl.[7] .............................. G06F 17/30
(52) U.S. Cl. ........................................ 707/102
(58) Field of Search ................ 707/102, 2, 3, 707/5, 1–200; 709/201

(56) References Cited

U.S. PATENT DOCUMENTS

| | | | |
|---|---|---|---|
| 5,495,558 A | 2/1996 | Tashima ..................... | 706/52 |
| 5,740,323 A | 4/1998 | Nomura et al. ............. | 706/13 |
| 5,764,854 A | 6/1998 | Ota et al. .................. | 706/8 |
| 5,841,948 A | 11/1998 | Ota et al. .................. | 706/52 |
| 5,905,978 A | 5/1999 | Smith et al. ............... | 706/52 |
| 5,924,085 A | 7/1999 | Werbos ...................... | 706/2 |
| 5,926,802 A | 7/1999 | Menke ....................... | 706/4 |
| 5,978,788 A | * 11/1999 | Castelli et al. ............ | 707/2 |
| 6,041,320 A | 3/2000 | Qin et al. .................. | 706/1 |
| 6,078,911 A | 6/2000 | Bonissone et al. .......... | 706/52 |
| 6,094,651 A | 7/2000 | Agrawal et al. ............ | 707/5 |
| RE36,823 E | 8/2000 | Takagi et al. .............. | 706/2 |
| 6,108,647 A | * 8/2000 | Poosala et al. ............. | 707/1 |
| 6,205,439 B1 | 3/2001 | Gardner ..................... | 706/7 |
| 6,438,537 B1 | * 8/2002 | Netz et al. ................. | 707/3 |
| 6,456,999 B1 | * 9/2002 | Netz ......................... | 707/2 |
| 2001/0054034 A1 | 12/2001 | Arning et al. .............. | 707/1 |

FOREIGN PATENT DOCUMENTS

| | | | |
|---|---|---|---|
| EP | 985988 A1 | 3/2000 | |
| JP | 2306015 A2 | 12/1990 | |
| JP | 5298108 A2 | 11/1993 | |
| JP | 61242210 A2 | 5/1994 | |

OTHER PUBLICATIONS

Pairceir, Ronan et al. (ACM publication, "Discovery of Multi–Level Rules and Exceptions form a Distributed Database", pp. 523–532, Aug. 2000).*

Chaudhuri, Surajit et al. (ACM publication, "An Overview of Data Warehousing and OLAP Technology", pp. 1–10, no date).*

Abstract No. C1999–09–1230R–046 "A fuzzy reasoning method for handling fuzzy rules with difference specificity levels," Ishibuchi, NAFIPS, 1999.

Abstract No. C2001–02–6170K–001 "Multidimensional fuzzy reasoning to represent and process default knowledge," Zhang et al, Mini–Micro Systems, vol. 21, No. 9, Sep., 2000.

U.S. patent application Ser. No. 09/500, 263, Agrawal et al., filed Feb. 8, 2000.

U.S. patent application Ser. No. 09/564,344, Malloy et al., filed May 4, 2000.

U.S. patent application Ser. No. 09/565,132, Malloy et al., filed May 4, 2000.

Sarawagi et al. (1998), "Discovery–Driven Exploration of Olap Cubes", Advances in Database Technology –EDBT 98, pp. 168–182.

* cited by examiner

*Primary Examiner*—Diane D. Mizrahi
(74) *Attorney, Agent, or Firm*—Ohlandt, Greeley, Ruggiero & Perle, L.L.P.

(57) ABSTRACT

There is provided a method for selecting a function for use in detecting a presence of an exception in multidimensional data. The method comprises the steps of (a) quantifying a characteristic of the multidimensional data, (b) determining a weighting factor of a function based on the quantified characteristic, and (c) selecting the function from a plurality of functions based on the weighting factor. The function is used for distinguishing the presence of an exception.

28 Claims, 5 Drawing Sheets

SELECTING A FUNCTION FOR USE IN DETECTING AN EXCEPTION IN MULTIDIMENSIONAL DATA

BACKGROUND OF THE INVENTION

1. Field of the Invention

The present invention relates to the multidimensional data modeling, and more particularly, to detecting exceptions in multidimensional data.

2. Description of the Prior Art

On-Line Analytical Processing (OLAP) is a computing technique for summarizing, consolidating, viewing, applying formulae to, and synthesizing data according to multiple dimensions. OLAP software enables users, such as analysts, managers and executives, to gain insight into performance of an enterprise through rapid access to a wide variety of data views that are organized to reflect the multidimensional nature of the enterprise performance data. An increasingly popular data model for OLAP applications is the multidimensional database (MDDB), which is also known as the data cube. OLAP data cubes are predominantly used for interactive exploration of performance data for finding regions of anomalies in the data, which are also referred to as exceptions or deviations. Problem areas and/or new opportunities are often identified when an anomaly is located.

An exception is defined by first considering a two-dimensional data cube having p values along a first dimension A and q values along a second dimension B. The element or quantity corresponding to the ith value of dimension A and jth value of dimension B is denoted as $y_{ij}$. To estimate the degree of surprise $y_{ij}$ holds in this data cube, an expected value $\hat{y}_{ij}$ of $y_{ij}$ is calculated as a function f of three terms: (1) a term $\mu$ that denotes a trend that is common to all y values of the cube, (2) a term $\alpha_i$ that denotes special trends along the ith row with respect to the rest of the cube, and (3) a term $\beta_j$ that denotes special trends along the jth column with respect to the rest of the cube. The residual difference $r_{ij}$ between the expected value $\hat{y}_{ij}=f(\mu,\alpha_i,\beta_j)$ and the actual value $y_{ij}$ represents the degree of surprise of element $y_{ij}$ based on its position in the cube.

When the data cube has three dimensions, for example, with dimension C being the third dimension, the expected value $\hat{y}_{ijk}$ is calculated by taking into account not only the kth value of the third dimension, but also the three values corresponding to the pairs (i,j) in the AB plane, (i,k) in the AC plane and (j,k) in the BC plane. The expected value $\hat{y}_{ijk}$ is then expressed as a function of seven terms as:

$$\hat{y}_{ijk}=f(\mu,\alpha_i,\beta_j,\gamma_k,(\alpha\beta)_{ij},(\alpha\gamma)_{ik},(\gamma\beta)_{kj}), \quad (1)$$

where $(\alpha\beta)_{ij}$ denotes the contribution of the ijth value in the AB plane, $(\alpha\gamma)_{ik}$ denotes the contribution of jkth value in the AC plane, and $(\gamma\beta)_{kj}$ denotes the contribution of the kjth value in the BC plane. In general, for any k dimensional cube, the y value can be expressed as the sum of the coefficients corresponding to each of the 2k-1 levels of aggregations or group-bys of the cube. To illustrate, a 3-dimensional cube will be considered.

The function f( ) can take several forms or models. Two particularly useful forms are an additive form, where function f( ) is a simple addition of all its arguments, and a multiplicative form, where function f( ) is a product of all its arguments. The multiplicative form can be transformed to the additive form by performing a logarithm on the original data values. Thus, the final form of Eq. (1) is, $$y_{ijk}=\hat{y}_{ijk}+r_{ijk}=\mu+\alpha_i+\beta_j+\gamma_k+(\alpha\beta)_{ij}+(\alpha\gamma)_{ik}+(\gamma\beta)_{kj}, \quad (2)$$

where $r_{ijk}$ is the residual difference between the expected value $\hat{y}_{ij}=f(\mu,\alpha_i,\beta_j)$ and the actual value $y_{ij}$. The relative importance of an exception is based on the relative value of its residual, that is, the higher the value of the residual, the higher the importance of the exception.

For a multiplicative model, the $y_{ijk}$ values denote the log of the original y-values of the cube. The choice of the best form of the function depends on the particular class of data, and is preferably selected by a user having the understanding and experience with the data at hand.

There are several ways for deriving values of the coefficients of Eq. (2). One approach is by a mean-based method where the coefficients are estimated as follows:

$$\mu=y_{...}=\text{overall mean or average} \quad (3)$$

$$\alpha_i=y_{i...}-\mu, \quad (4)$$

where $y_{i...}$ is the mean over all numbers with the ith value of A. Thus, for a two-way table, $\alpha_i$ denotes the magnitude of the difference of the average of the numbers along the ith row from the overall average $\mu$.

$$\beta_j=y_{.j.}-\mu, \quad (5)$$

where $y_{.j.}$ is the mean over all numbers with the jth value of B.

$$\gamma_k=y_{..k}-\mu, \quad (6)$$

where $y_{..k}$ is the mean over all numbers with the kth value of C. Lastly, $$(\alpha\beta)_{ij}=y_{ij}-\alpha_i-\beta_j-\mu \quad (7)$$

The remaining terms are defined analogously.

In general, the coefficient corresponding to any group-by G is recursively calculated by subtracting all coefficients from group-bys that are at a smaller level of detail than group G from the average y value at group-by G.

The mean-based approach for calculating the coefficients is not particularly robust in the presence of extremely large outliers. Consequently, a number of well-known alternative approaches for handling large outliers can be used, such as the median polish method and the square combining method, disclosed by D. Hoaglin et al., Exploring data tables, trends and shapes, Wiley series in probability, 1988, and incorporated by reference herein. These two alternative approaches are based on using a "median" instead of "mean" for calculating the coefficients. Nevertheless, these alternative approaches have an associated high computational cost. Consequently, the mean-based approach is preferred for most OLAP data sets because significantly large outliers are uncommon in most data sets.

The method for determining residual and coefficients can be extended to handle hierarchies along one or more dimensions of a data cube. The basic idea is to define the expected value of a data cube element, not only based on its row and column position, but also on its hierarchical parents. For instance, consider values $y_{ij}$ in a data cube consisting of two dimensions A and B, where dimension A has two levels of hierarchies: $A^1 \rightarrow A^2 \rightarrow \text{ALL}$. To calculate an expected value $\hat{y}_{ij}$ at the $A^1B$ level, the row coefficient $\alpha_i$ at level $A^1$, the column coefficient $\beta_j$ at level B and overall coefficient $\mu$ at level ALL, two new terms corresponding to the two new aggregations $A^2$ and $A^2B$ along the hierarchy on A are used. Equation (2) thus becomes:

$$\hat{y}_{ij}=\mu+\alpha_i+\beta_j+\alpha'_i+(\alpha'\beta)_{ij} \quad (8)$$

where i' denotes the parent of i at hierarchy level $A^2$, $\alpha'_i$ denotes the contribution of the ith value at level $A^2$, and $(\alpha'\beta)_{ij}$ denotes the contribution due to the ijth value at level $A^2B$.

The general formula for handling hierarchies is to express a y value in a cube in terms of coefficients obtained from all higher level aggregations of the cube. For example, for the y-values at $A^1B$ in Eq. (8), coefficients from the five higher level aggregates are used, that is, $A^1$, $A^2$, B, $A^2B$, and ALL. The same recursive rule of the previous subsection is followed for estimating the coefficients, where $\mu$ is first estimated as the overall average, and then for terms corresponding to each group-by G. The average at group-by G is computed and then the coefficients from each child of G are subtracted from the computed average.

The current "deviation detection" module of the DB2 OLAP Server uses a log-linear form of function 'f' described in Eq.(1). A multiplicative or log-linear function is well justified for many of the OLAP cubes that have distributive aggregation functions, such as sum and count, associated with the dimensions of the cube. However, a log-linear function may not be appropriate in cases where the OLAP cube is built with dimensions that do not exhibit distributive aggregation. In such a case, a selection of a log-linear function could be inappropriate or insufficient and can lead to only partially useful results. If the aggregation function is non-distributive, i.e., if it can be expressed as an algebraic function of some finite distributive arguments, then an additive or linear function may be an appropriate choice.

SUMMARY OF THE INVENTION

It is an object of the present invention to provide an improved method for selecting a function and for exploring exceptions in multidimensional data.

It is another object of the present invention to provide such a method where the function is a member of a set of functions including a log-linear function and a linear function.

These and other objects of the present invention are achieved by a method for selecting a function for use in detecting a presence of an exception in multidimensional data. The method comprises the steps of (a) quantifying a characteristic of the multidimensional data, (b) determining a weighting factor of a function based on the quantified characteristic, and (c) selecting the function from a plurality of functions based on the weighting factor. The function is used for distinguishing the presence of an exception.

Another embodiment of the present invention is method for selecting a function for use in detecting a presence of an exception in multidimensional data, comprising the steps of (a) quantifying a data distribution characteristic of the multidimensional data, (b) quantifying a distributive characteristic of an aggregation function of the multidimensional data, (c) determining a weighting factor of a function based on the quantified data distribution characteristic and the quantified distributive characteristic of the aggregation function, and (d) selecting the function from a plurality of functions based on the weighting factor. The function from the plurality of functions is used for distinguishing the presence of an exception.

DESCRIPTION OF THE INVENTION

The present invention is concerned with the selection of one or more functions for determining a presence of an exception in multidimensional data by calculating an expected or anticipated value of data. When exploring for exceptions, a linear model uses one or more linear functions, and a multiplicative model uses one or more multiplicative functions. A log-linear model, which is a type of multiplicative model, uses a log-linear function.

In exception exploration of multidimensional data, e.g., an OLAP cube, there are advantages to using both linear and multiplicative functions. Hence, the present invention utilizes both (1) a linear/additive function, and (2) a multiplicative function for exception exploration.

In one embodiment of the present invention, a fuzzy inference engine determines whether a linear function and/or a multiplicative function will be used for exception exploration based on a distribution of data and the nature of an aggregation function for the multi-dimensional data. If both the linear function and the multiplicative function are used, the present invention determines their respective contribution in the final set of exceptions.

Depending on the inherent data distribution characteristics, representation of which can be realized, as an example, by skewness index or variance, and the type of aggregation function used to build the OLAP cube, for example, 'count' or 'sum', a weighting for the use of a linear function and a multiplicative function can be calculated. Assuming that there are a fixed maximum number of deviations N to be explored, the fraction of these results to be obtained from linear and multiplicative functions can be calculated by using a fuzzy logic based inference engine.

One advantage of the present invention is that it provides an automatic and/or user interactive selection of two powerful sets of functions for exception exploration in a unified way. This enables employment of a suitable function or functions, enhancing the usefulness of the exception exploration process. This methodology is fairly general in nature and can be extended to any number of sets of functions if so desired, even though the present description uses only two functions, one each from a linear set and the other from a multiplicative set.

Another advantage of the present invention is that it does not assume anything about data distribution and hence it is applicable to a variety of exception exploration problems for many subsets of multidimensional data models.

The present invention uses parameters such as, for example, skewness and percentage of distributive dimensions, as inputs for its decision-making process, and it employs a fuzzy logic-based inference engine to determine a weighting for a multiplicative function. Fuzzy logic is a well-known method of machine learning for capturing non-linearities. The fuzzy inference engine is particularly desirable because of its ease of accommodating additional input parameters, and thus, many additional parameters can be included in the fuzzy inference engine structure to handle various levels of complexity.

A basic premise of the present invention is that it uses multiple models for the same OLAP cube for finding deviations, and it weighs the results based on factors such as, but not limited to, skewness of data and percentage of distributive aggregation functions in an outline of the OLAP cube. "ANalysis Of VAriance" (ANOVA) is a well-known statistical technique described by D. G. Montgomery, in 'Design and Analysis of experiments', Chapter 13, John Wiley & Sons, Third edition, 1991. Current models, of both the prior art and the present invention, are adapted versions of the general ANOVA model. There are versions of multiplicative ANOVA-based models, which are generally suited for skewed data and distributive aggregation functions, and linear ANOVA-based models, which are generally suited for normal distribution and non-distributive aggregations functions, each of which can be applied in the analysis of the OLAP cube. These two models have different advantages, but by their very nature are better suited for different target cubes based on the characteristics of aggregation functions in the multidimensional database and the skewness of data.

A function F is distributive if:

∀ data sets $C_i \in C$ $F(C) = F(F(C_1), F(C_2), \ldots, F(C_n))$ where $C = \cup_{i=1}^{N} C_i$ Some examples of distributive aggregation functions that are relevant to OLAP cubes are "count", or "sum". However, functions such as "variance" or "average" are not distributive. Hence, for non-distributive functions F', $F'(C) \neq F'(F'(C_1), F'(C_2), \ldots F'(C_n))$ where $C = \cup_{i=1}^{N} C_i$ For example, for function "average" denoted by '$f$' let $C_1 = \{3,5\}$, $C_2 = \{5,6,7\}$, and
$C = \cup_{i=1}^{2} C_i = \{3,5,5,6,7\}$.
$f(C_1) = 4$; $f(C_2) = 6$;
$f(f(C_1), f(C_2)) = f(4,6) = 5$.
$f(C) =$ Average $\{3,5,5,6,7\} = 26/5 = 5.2$.

Therefore, $f(C) \neq f(f(C_1), f(C_2))$

Average will be categorized as 'algebraic' since it can be expressed by an algebraic function with M distributive function arguments where M is a bounded integer. Average can be expressed as $\{(Sum)/(Count)\}$, with M=2. Sum and Count are distributive functions.

In an OLAP cube when aggregation functions are not distributive, it may not be correct to assume that influence from all functions will take a multiplicative form and hence the use of a log-linear function for exception exploration may not work the best.

Using the standard ANOVA-based model using a linear function, and adapting it by extending Eq. (1) for n-dimensional data, for a value $y_{i1,i2,\ldots,in}$ in a cube C, e.g., a multidimensional data model, at position $i_r$ of the $r^{th}$ dimension $d_r$ ($1 \leq r \leq n$), the anticipated value $\hat{y}_{i1,i2,\ldots,in}$ as a function $f$ of contributions from various higher group-bys is:

$\hat{y}_{i1,i2,\ldots,in} = f(\gamma^G(i_r|d_{r \in G})|G \subset \{d_1, d_2, \ldots, d_n\})$ $\hat{y}_{i1,i2,\ldots,in} = \Pi \gamma^G(i_r|d_{r \in G})$ $G \Pi \{d_1, d_2, \ldots, d_n\}$ The γ terms as the coefficients of the model equation are:

$\hat{y}_{i1,i2,\ldots,in} = \Sigma \Phi^G(i_r|d_{r \in G})$ $G \subset \{d_1, d_2, \ldots, d_n\}$ $\Phi_0 = \Phi_{+,+,\ldots,+} =$ Overall mean of all cells of a certain aggregation level where $\Phi_{i1,i2,\ldots,in} = y_{i1,i2,\ldots,in}$ for linear and $\Phi_{i1,i2,\ldots,in} = J(y_{i1,i2,\ldots,in})$ for a multiplicative model "J" is a non-linear function. One form of J could be a 'log' function.

$\Phi_{ir}^{Ar} = \Phi_{i1,+,\ldots,+,ir,.+} - \Phi_0$ and so on . . .

Then the residual of the model is defined as:

$r_{i1,i2,\ldots,in} = |y_{i1,i2,\ldots,in} - \hat{y}_{i1,i2,\ldots,in}|$

The greater the value of $r_{i1,i2,\ldots,in}$, the more likely that the tuple is an exception in the data model. However, it should be standardized for meaningful comparison. The residual can be standardized by calculating a "standardized residual" as follows:

$S_{i1,i2,\ldots,in} = y_{i1,i2,\ldots,in} - \hat{y}_{i1,i2,\ldots,in}|/\sigma_{i1,i2,\ldots,in}$ The value of $\sigma_{i1,i2,\ldots,in}$ is a normalizer, which can be calculated as an associated standard deviation for the tuple $y_{i1,i2,\ldots,in}$. A standardized residual can then be used to rank the exceptions that are found. The higher the value of the standardized residual, the higher is the rank. The first exception in a decreasingly sorted array of exceptions will have the highest value of standardized residual.

The linear model is a good choice for OLAP cubes where aggregation functions are not distributive. For example, if the OLAP cube has Per Capita Income=Total Income/Population, or Population density=Sum of population per city/area of each city and so on. Also, this is a good choice for a relatively normal distribution of data. The multiplicative model is well suited for commonly used aggregation functions that are distributive, e.g., sum, min, max, and it is also well suited for asymmetric and relatively skewed data.

The present invention utilizes both a linear function and a multiplicative function. However, it is not limited to a case of one linear function and one multiplicative function, but instead contemplates a use of one or more different linear functions and one or more different multiplicative functions, and combinations thereof. For example, the method of the present invention applies to the case of a plurality of functions that includes a linear function and two different multiplicative functions.

In accordance with the present invention, after the OLAP sub-cube is selected for the purpose of deviation detection, the following steps are followed:

1. Obtaining a total number of deviations [$N^T$] to be displayed to a user.
2. Calculation of some overall measure/index of data distribution for a sub-cube in question in all dimensions for skewness %.
3. Grouping of functions that are used to build the sub-cube into "distributive" and "non-distributive" categories; and subsequent calculation of percentage of "distributive" dimensions.
4. Using these two inputs, i.e., skewness % and distributive dimensions %, a fuzzy inference engine determines a weighting between 0 and 1. This weighting represents the fraction of results from the multiplicative function to be included in the final set of exceptions.
5. Determining a quantity of results from each type of function that will be used.
6. Dealing with common deviations arising from two methods to present $N^T$ distinct deviations maintaining the ratio of results from the multiplicative function.

Based on input from a user, let $N^T$ be the number of deviations shown to the user. For example, let the total number of deviations to be shown be 50.

For calculating the overall measure/index of data distribution for the sub-cube, as a start, assume a default value of 50% for asymmetry in data. A non-default value can be obtained in two ways: (A) user interaction, where the user modifies a value through use of a graphical user interface (GUI); and (B) automatic calculation.

For automatic calculation, in individual dimensions of the cube, calculation of some overall measure/index of data distribution is performed. One technique is to calculate 'skewness coefficient' of data in each dimension. This skewness coefficient can be Karl Pearson's coefficient:

Skewness coeff=(Mean−Mode)/(Standard deviation)

In the alternative, the skewness coefficient can be Bowley's coefficient or Kelly's coefficient. Bowley's coefficient is used in this work because it is bounded by −1 and +1. However, the present invention is not limited to only these three coefficients.

For dimension $d_i$, let Bowley's skewness index=$Sk_{di}$:

Bowley's skewness coefficient=$[Q_3+Q_1-2*Median]/[Q_3+Q_1]$,

Where $Q_3$ is the third quartile and $Q_1$ is the first quartile.

Since $-1 \leq$ Bowley's skewness coefficient $\leq 1$;

Overall % skewness in data=$\Sigma |Sk_{di}|*100/m$ $\{d_1, d_2, \ldots, d_m\}$ where m is the number of dimensions in the subset of the n-dimensional data (m≦n).

Let skewness in the data be 70%.

For calculating percentage of "distributive" dimensions, as a start, assume a default value of 50% for distributive dimensions. A non-default value can be obtained in two ways: (A) user interaction, where the user modifies a value through use of a graphical user interface (GUI); and (B) automatic calculation.

For automatic calculation, from all the relevant dimensions, percentages of dimensions matching from a look-up table of common distributive dimensions can be found. The look-up table stores commonly used distributive functions such as sum, min and max. It also stores commonly used algebraic functions such as average and variance. A distributive dimension conforms to the following constraints:

∀ data sets $C_i \in C$ $F(C)=F(F(C_1), F(C_2), \ldots, F(C_n))$ where $C=\cup^N_{i=1} C_i$ If these constraints are not followed, then the dimension is non-distributive. Thus, by the end of this step, a percentage of distributive dimensions is calculated from all relevant dimensions. For example, given an OLAP cube with 10 dimensions, let 6 out of 10 dimensions be distributive. Thus, the percentage of distributive dimensions is 60%.

Based on the knowledge of skewness of data and percentage of dimensions belonging to the "distributive aggregation function", a weighting on the use of log-linear method can be determined by a fuzzy engine. Percentage skewness and percentage of distributive dimensions are the inputs to this fuzzy engine.

Figure 1:
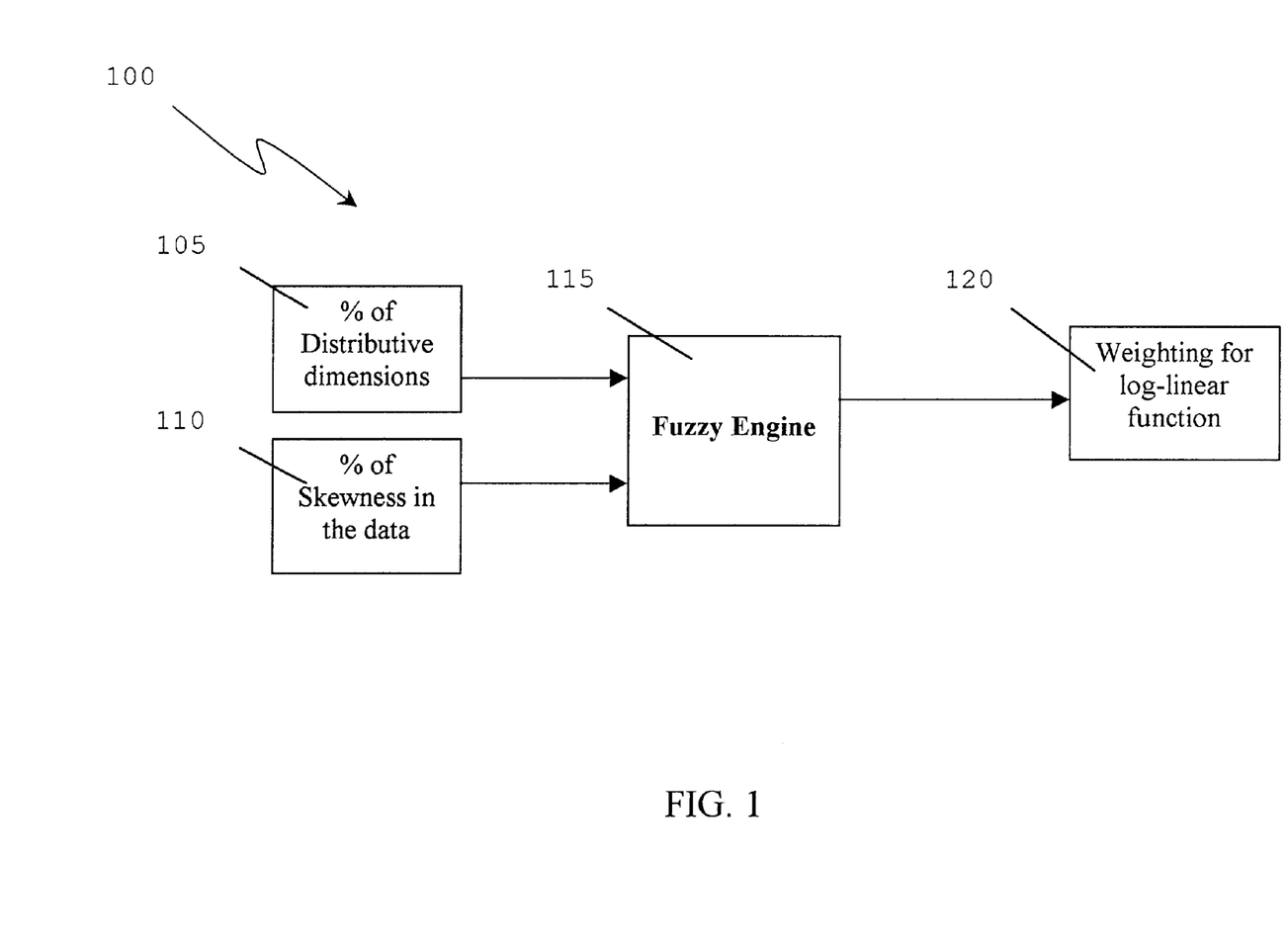
FIG. 1 is a functional diagram of a process that employs a fuzzy engine to determine a weighting for a log-linear function, in accordance with the present invention.

FIG. 1 is a functional diagram of a process 100 that employs a fuzzy engine 115 to determine a weighting for a log-linear function 120, in accordance with the present invention. As shown, a percentage of distributive dimensions 105, and a percentage of skewness in data 110 each serve as inputs to fuzzy engine 115. The output of fuzzy engine 115 is a weighting for log-linear function 120.

The fuzzy modeling process involves three main steps, namely fuzzification, fuzzy operations, and defuzzification. Each of these steps is described in detail, below.

Fuzzification is a process where scalar values are converted to fuzzy vectors using reference sets. Fuzzy reference sets can have many shapes, e.g., triangular, parabolic or elliptical. The number of reference sets for each input could also be varied.

Figure 2:
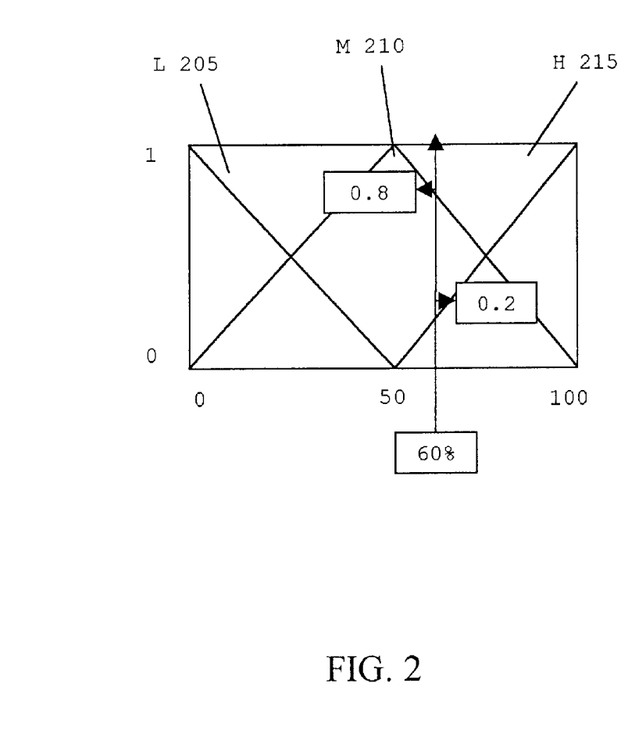
FIG. 2 is a diagram showing an exemplary fuzzification of a percentage of distributive dimensions.

FIG. 2 is a diagram showing an exemplary fuzzification of a percentage of distributive dimensions (see FIG. 1, reference 105). There are three triangular, uniformly spaced reference sets with linguistic labels, namely low (L) 205, medium (M) 210 and high (H) 215.

Reference set L 205 is represented by a triangle with apexes (0,0), (0,1) and (50,0). For a scalar value of a percentage of distributive dimension in the range of 0% through 50%, (0,50), there is a non-zero "membership" in, or "belongingness" to, reference set L 205. This membership or degree of truth is denoted on the Y-axis, which ranges from 0 to 1. Similarly, reference set M 210 is represented by a triangle with apexes (0,0), (50,1) and (100,0), and reference set H 215 is represented by a triangle with apexes (50,0), (100,1) and (100,0). For a scalar value of a percentage of distributive dimension in the range of 0% through 100%, (0,100), there is a non-zero membership in reference set M 210. For a scalar value of a percentage of distributive dimension in the range of 50% through 100%, (50,100), there is a non-zero membership in reference set H 215. This is a fundamental concept of a fuzzy reference set that can be found in any standard book on fuzzy modeling.

Figure 3:
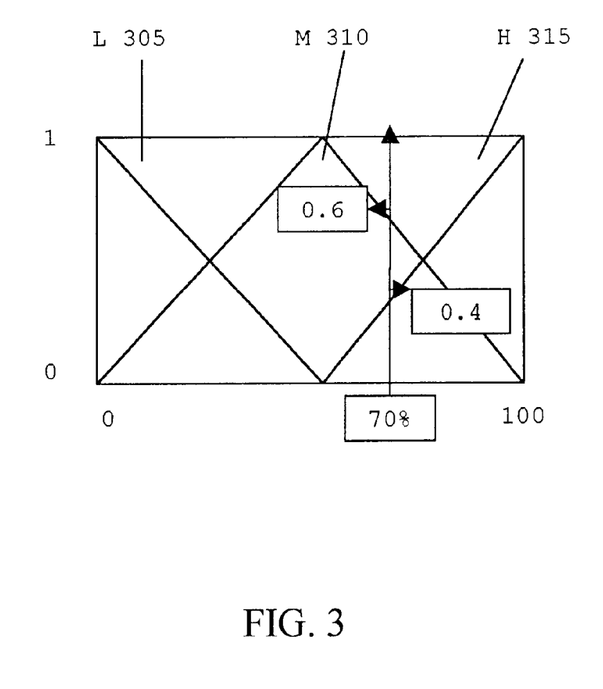
FIG. 3 is a diagram showing an exemplary fuzzification of percentage skewness in data.
Figure 4:
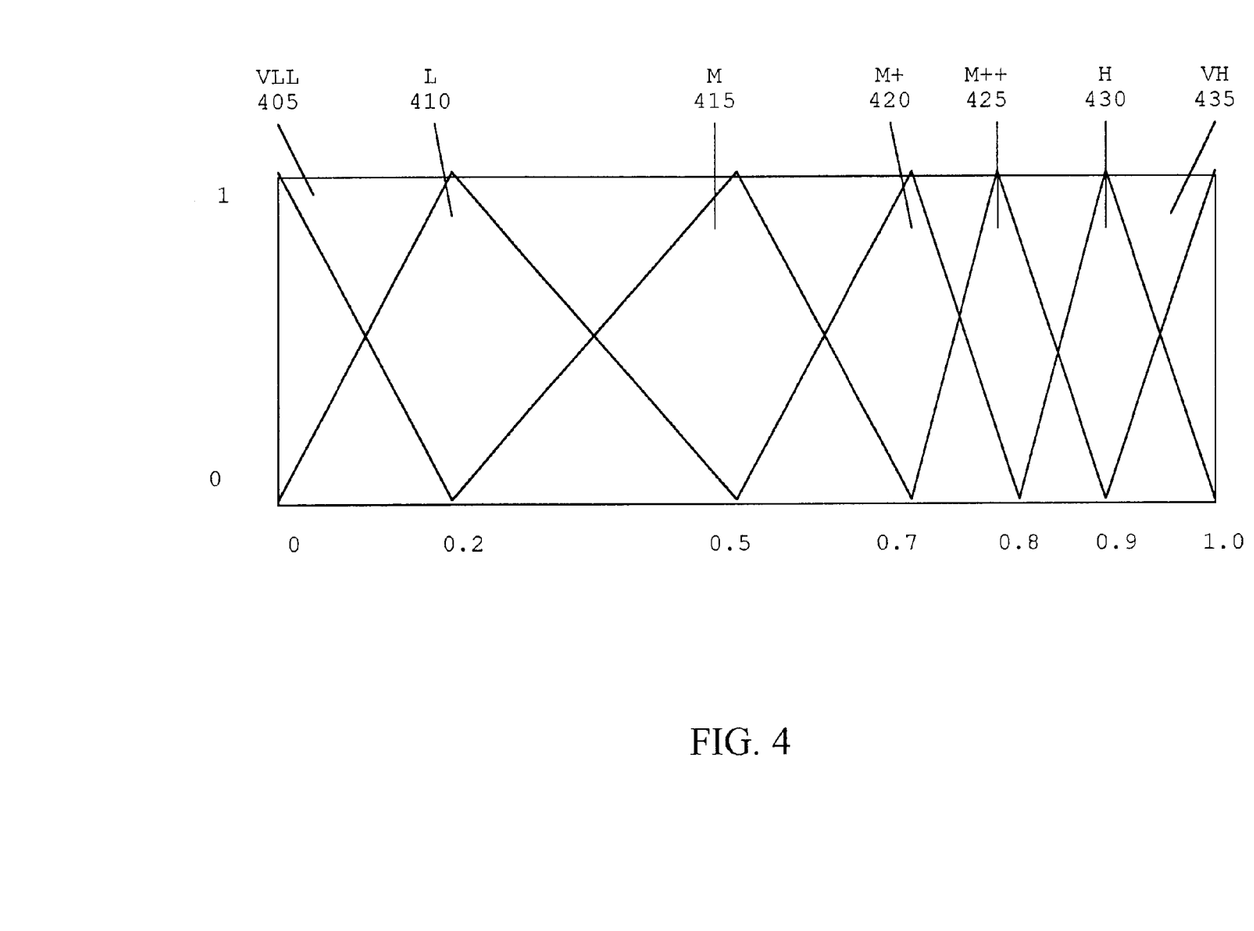
FIG. 4 is a diagram showing an exemplary fuzzification of a weighting on a multiplicative function.

For example, 6 out of 10 dimensions being distributive means that 60% of the dimensions are distributive. Thus, 60% for percentage of distributive dimensions converted to a fuzzy vector using fuzzy reference sets is:

Fuzzy vector for 60% of Distributive dimensions=$\{0_{\epsilon L}, 0.8_{\epsilon M}, 0.2_{\epsilon H}\}$ FIG. 3 is a diagram showing an exemplary fuzzification of the variable percentage skewness in data (see FIG. 1, reference 110). Similarly to the arrangement of FIG. 2, there are three triangular, uniformly spaced reference sets, namely L 305, M 310 and H 315. Overall skewness percentage of data being 70, translates into a fuzzy vector as:

Fuzzy vector for 70% Skewness=$\{0_{\epsilon L}, 0.6_{\epsilon M}, 0.4_{\epsilon H}\}$ FIG. 4 is a diagram showing an exemplary fuzzification of a weighting on a log-linear function (see FIG. 1, reference 120). There are seven non-uniformly spaced, triangular reference sets, namely very low (VL) 405, low (L) 410, medium (M) 415, medium plus (M+) 420, medium plus plus (M++) 425, high (H) 430 and very high (VH) 435. As an example, reference set VL 405 is represented as a triangle with apexes (0,0), (0,1) and (0.2,0).

In the step of fuzzy operations, the fuzzy vectors that were obtained during fuzzification are subjected to processing by fuzzy operators. There are many fuzzy operators available in literature. For the purpose of illustration, the 'summated product' operator (•) is shown below, although any other fuzzy operator could be used such as, for example, max-min, min-max, and max-product.

Weighting on multiplicative (log-linear) function=$W_{log-linear}$ $W_{log-linear}$=R•( % Skewness)•(% Distributive dimensions)

For this the fuzzy engine employs a 'Fuzzy Model' or a set of rules that encapsulates relationships between its inputs and output. This rule-base is represented as R in the above model. This set of rules is sometimes called the fuzzy inference model. TABLE 1 shows a fuzzy inference model with nine rules.

TABLE 1

| % Distributive dimensions | % Skewness | | |
|---|---|---|---|
| | Low | Medium | High |
| Low | VL | L | M+ |
| Medium | L | M | H |
| High | M+ | M++ | VH |

One possible and illustrative fuzzy inference rule for determining the weighting on log-linear function is given below. This rule pertains to weighting on log-linear function output belonging to fuzzy reference sets of [M+]. For example, in TABLE 1, refer to the third row, i.e., % of Distributive dimensions=High, and the second column, i.e., % Skewness=Medium, i.e., Rule 3,2:

IF [(% Skewness is Medium) AND (% Distributive dimensions is High)]

THEN Weighting on log-linear function is M++.

The fuzzy model uses all applicable rules to find the overall impact of the inputs on the output sets to determine the fuzzy vector set of the output. Only four rules out of nine possible rules will fire a non-zero result.

1. (% distributive dimensions=M) AND (%Skewness=M): Rule 1
    Output=M apex value for this reference set=[0.5]
2. (% distributive dimensions=M) AND (%Skewness=H): Rule 2
    Output=H apex value for this reference set=[0.9]
3. (% distributive dimensions=H) AND (%Skewness=M): Rule 3
    Output=M++ apex value for this reference set=[0.8]
4. (% distributive dimensions=H) AND (%Skewness=H): Rule 4
    Output=VH apex value for this reference set=[1.0]

The defuzzification step is the reverse process of the fuzzification step. Here the fuzzy output from each rule is used to provide a scalar output. For the four rules that would be fired with a non-zero effect, the resultant output is calculated as a fuzzy mean as follows:

$$W_{\text{log-linear}} = \frac{0.8*0.6*(0.5)+0.8*0.4*(0.9)+0.2*0.6*(0.8)+0.2*0.4*(1.0)}{0.8*0.6+0.8*0.4+).2*0.6+0.2*0.4}$$

$W_{\text{log-linear}} = 0.704$

This particular example uses a fuzzy mean defuzzification technique, however, any other technique can be used, for example, center of area or the mean of maximum.

The present invention calculates a number of results out of a total $N^T$ obtained from different models. Then $W_{\text{log-linear}}$ as determined from the fuzzy reference engine can be used to determine if linear and multiplicative functions need to be used. If $W_{\text{log-linear}}$ is very large (say>0.95), then it is not advisable to use a linear function. On the other hand if $W_{\text{log-linear}}$ is very small (say<0.05), then it is not advisable to use a multiplicative function.

If $0.05 \leq W_{\text{log-linear}} \leq 0.95$, then the number of distinct cases to be presented from linear functions is $\text{Linear}^T = (1-W_{\text{log-linear}})*N^T$, and the number of deviations to be shown from multiplicative functions is=$\text{log-linear}^T = W_{\text{log-linear}*N}{}^T$.

$\text{Linear}^T + \text{log-linear}^T = N^T$

In the example at hand, $W_{\text{log-linear}} = 0.704$. Since $(0.05 \leq 0.704 \leq 0.95)$, BOTH of the functions, that is, the linear function and the multiplicative function, will be used. Furthermore, this means that 35 top distinct deviations, i.e., 70% of results of 50, should come from the multiplicative function and 15 should come from the linear function.

There is a possibility that there will be an overlap of results. For example, there might be 5 exceptions out of 35 found from the multiplicative function that are also found in the 15 found by linear function. Thus, when these results are put together, the final set consists of only 45 distinct exceptions as opposed to the 50 that were desired. The overlapping deviations are of great importance since they represent strong deviations irrespective of the function used to detect them, and a special display of those can be very helpful. In such a case, the process is repeated until $N^T$ (=50) distinct deviations are presented. This is done by finding the next 4 (ranks of 36, 37, 38, 39) exceptions from the sorted list of multiplicative function-based exceptions and 16th exception listed in the sorted list of the linear function. Thus maintaining the ratio of $W_{\text{log-linear}}$ until $N^T$ distinct exceptions are found, giving preference to distributive dimension, enables finding the desired $N^T$ exceptions.

Figure 5:
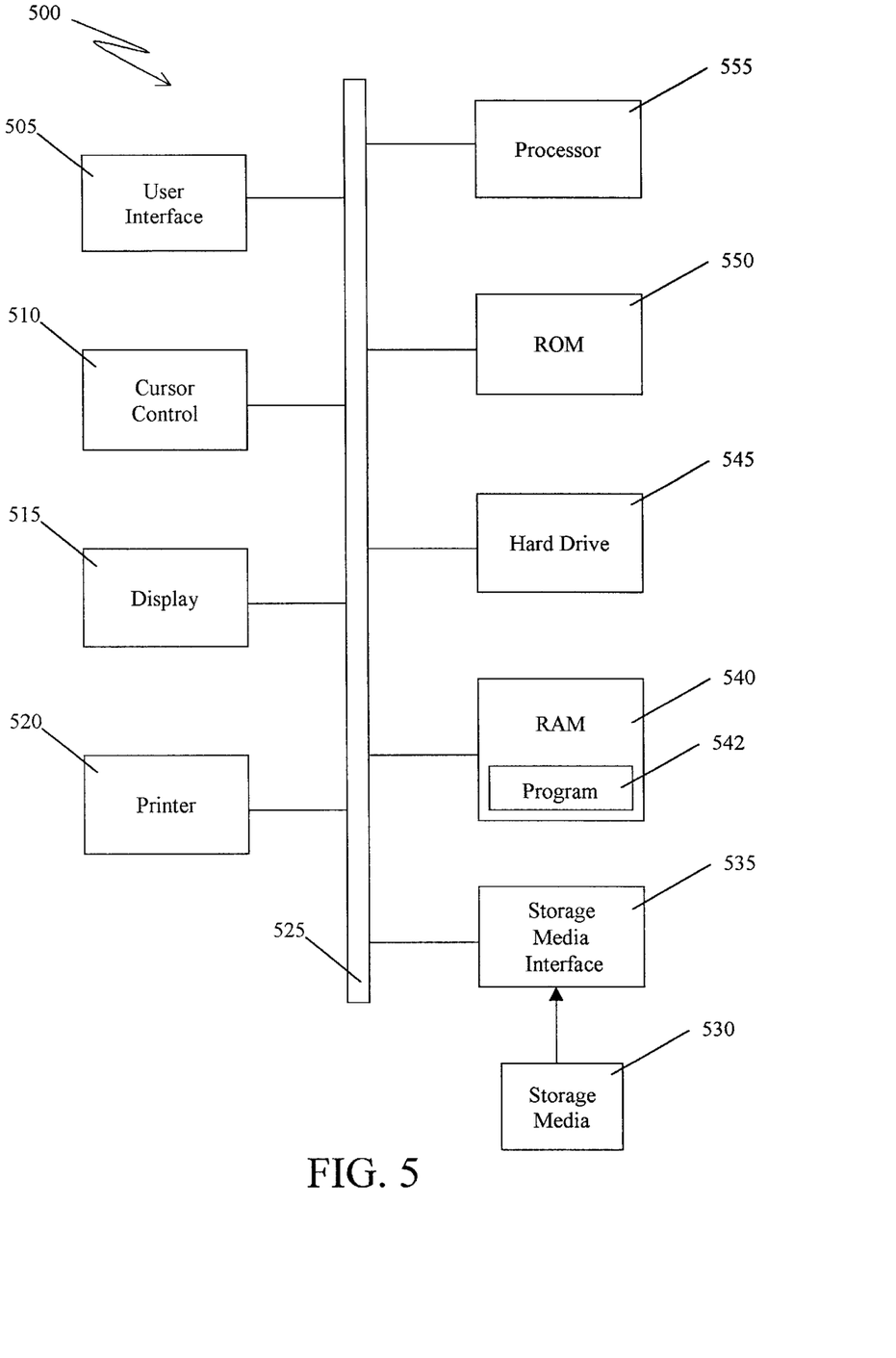
FIG. 5 is a block diagram of a computer system suitable for employment of the present invention.

FIG. 5 is a block diagram of a computer system 500, suitable for employment of the present invention. System 500 may be implemented on a general-purpose microcomputer, such as one of the members of the SUN Microsystems family of computer systems, one of the members of the IBM Personal Computer family, or other conventional work-station or graphics computer device. In its preferred embodiment, system 500 includes a user interface 505, a cursor control 510, a display 515, a printer 520, a processor 555, a read only memory (ROM) 550, a hard drive 545, a random access memory (RAM) 540, and a removable storage interface 535, all of which are coupled to a bus 525 or other communication means for communicating information. Although system 500 is represented herein as a standalone system, it is not limited to such, but instead can be part of a networked system.

RAM 540, hard drive 545 and ROM 550, are memory components that store data and instructions for controlling the operation of processor 555, which may be configured as a single processor or as a plurality of processors. Processor 555 executes a program 542 to perform the methods of the present invention, as described herein.

While program 542 is indicated as loaded into the RAM 540, it may be configured on a storage media 530 for subsequent loading into hard drive 545, ROM 550 or RAM 540 via an appropriate storage media interface 535. Storage media 530 can be any conventional storage media such as a magnetic tape, an optical storage media, a compact disk or a floppy disk. Alternatively, storage media 530 can be a random access memory, or other type of electronic storage, located on a remote storage system.

User interface 505 is an input device, such as a keyboard or speech recognition subsystem, for enabling a user to communicate information and command selections to processor 555. The user can observe information generated by system 500 via display 515 or printer 520. Cursor control 510 is a device such as a mouse, track-ball, or joy stick, that allows the user to manipulate a cursor on display 515 for communicating additional information and command selections to processor 555.

When operating in accordance with one embodiment of the present invention, system 500 selects a function for use in detecting a presence of an exception in multidimensional data. Processor 555 and program 542 collectively operate as a module for (a) quantifying a characteristic of the multidimensional data, (b) determining a weighting factor of a function based on the quantified characteristic, and (c) selecting the function from a plurality of functions based on the weighting factor. The function is used for distinguishing the presence of an exception.

In accordance with another embodiment of the present invention, processor 555 and program 542 serve as a module for (a) quantifying a data distribution characteristic of the multidimensional data, (b) quantifying a distributive characteristic of an aggregation function of the multidimensional data, (c) determining a weighting factor of a function based on the quantified data distribution characteristic and the quantified distributive characteristic of the aggregation function, and (d) selecting the function from a plurality of functions based on the weighting factor. The function from the plurality of functions is used for distinguishing the presence of an exception.

The present invention offers many advantages over prior art techniques. It deploys multiple models to perform ANOVA based exception exploration in N-dimensional data models by determining an appropriateness of multiple functions based on data and data model characteristics, quantifying the weight and emphasis for results from each of the functions, and determining a final set of distinct exceptions by resolving potential overlaps of results from the multiple functions. Some of the distinguishing aspects of the invention are that it (1) provides for explicit evaluation of data and data model characteristics prior to exception exploration; (2) uses multiple functions on the same data; (3) uses a fuzzy inference engine for selecting functions and quantifying the emphasis on results obtained from each of the functions; and (4) resolves potential overlap of results from multiple functions to evolve distinct exceptions for data.

It should be understood that various alternatives and modifications can be devised by those skilled in the art. For example, the data characteristics employed by these teachings have been described as percentage of distributive dimensions of the multidimensional data and percentage of skewness of the multidimensional data. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims.

What is claimed is:

1. A method for selecting a function for use in detecting a presence of an exception in multidimensional data, comprising:
   quantifying a characteristic of said multidimensional data;
   determining a weighting factor of a function based on said quantified characteristic; and
   selecting said function from a plurality of functions based on said weighting factor;
   wherein said function is used for distinguishing the presence of an exception.

2. The method of claim 1, wherein said characteristic comprises a data distribution characteristic of said multidimensional data.

3. The method of claim 2, wherein said data distribution characteristic comprises a percentage of skewness of said multidimensional data.

4. The method of claim 1, wherein said characteristic comprises a distributive characteristic of an aggregation function of said multidimensional data.

5. The method of claim 4, wherein said distributive characteristic of said aggregation function comprises a percentage of distributive dimension of said multidimensional data.

6. The method of claim 1, wherein determining said weighting factor applies a fuzzy logic inference.

7. The method of claim 1, wherein said plurality of functions comprises a multiplicative function.

8. The method of claim 7, wherein said multiplicative function comprises a log-linear function.

9. The method of claim 1, wherein said plurality of functions comprises a linear function.

10. The method of claim 1,
    wherein said weighting factor is a first weighting factor,
    wherein said function is a first function, and
    wherein said method further comprises:
        determining a second weighting factor for a second function based on said quantified characteristics; and
        selecting said second function from said plurality of functions based on said second weighting factor,
    wherein said second function is also used for distinguishing the presence of an exception.

11. The method of claim 10,
    wherein said first function is used for distinguishing a first set of exceptions,
    wherein said second function is used for distinguishing a second set of exceptions,
    wherein said method further comprises reporting said first and second sets of exceptions, and
    wherein an exception that is common to both said first set and said second set is reported only once.

12. The method of claim 11, further comprising reporting a quantity of exceptions from said first set and a quantity of exceptions from said second set in a ratio that is approximately equal to a ratio between said first weighting factor and said second weighting factor.

13. The method of claim 1, wherein said selecting comprises selecting said function based on said weighting factor relative to a weighting factor of another of said plurality of functions.

14. A method for selecting a function for use in detecting a presence of an exception in multidimensional data, comprising:
    quantifying a data distribution characteristic of said multidimensional data;
    quantifying a distributive characteristic of an aggregation function of said multidimensional data;
    determining a weighting factor of a function based on said quantified data distribution characteristic and said quantified distributive characteristic of said aggregation function; and
    selecting said function from a plurality of functions based on said weighting factor,
    wherein said function from said plurality of functions is used for distinguishing the presence of an exception.

15. The method of claim 14, wherein said data distribution characteristic comprises a percentage of skewness of said multidimensional data.

16. The method of claim 14, wherein said distributive characteristic of said aggregation function comprises a percentage of distributive dimension of said multidimensional data.

17. The method of claim 14, wherein said determining said weighting factor applies a fuzzy logic inference.

18. The method of claim 14, wherein said plurality of functions comprises a multiplicative function.

19. The method of claim 18, wherein said multiplicative function comprises a log-linear function.

20. The method of claim 14, wherein said plurality of functions comprises a linear function.

21. The method of claim 14,
wherein said weighting factor is a first weighting factor,
wherein said function is a first function, and
wherein said method further comprises:
- determining a second weighting factor for a second function based on said quantified data distribution characteristic and said quantified distributive characteristic of said aggregation function; and
- selecting said second function from said plurality of functions based on said second weighting factor, wherein said second function is also used for distinguishing the presence of an exception.

22. The method of claim 21,
wherein said first function is used for distinguishing a first set of exceptions,
wherein said second function is used for distinguishing a second set of exceptions,
wherein said method further comprises reporting said first and second sets of exceptions, and
wherein an exception that is common to both said first set and said second set is reported only once.

23. The method of claim 22, further comprising reporting a quantity of exceptions from said first set and a quantity of exceptions from said second set in a ratio that is approximately equal to a ratio between said first weighting factor and said second weighting factor.

24. The method of claim 14, wherein said selecting comprises selecting said function based on said weighting factor relative to a weighting factor of another of said plurality of functions.

25. A storage media containing instructions for controlling a processor for selecting a function for use in detecting a presence of an exception in multidimensional data, said storage media comprising:
- instructions for controlling said processor to quantify a characteristic of said multidimensional data;
- instructions for controlling said processor to determine a weighting factor of a function based on said quantified characteristic; and
- instructions for controlling said processor to select said function from a plurality of functions based on said weighting factor;

wherein said function is used for distinguishing the presence of an exception.

26. A storage media containing instructions for controlling a processor for selecting a function for use in detecting a presence of an exception in multidimensional data, said storage media comprising:
- instructions for controlling said processor to quantify a data distribution characteristic of said multidimensional data;
- instructions for controlling said processor to quantify a distributive characteristic of an aggregation function of said multidimensional data;
- instructions for controlling said processor to determine a weighting factor of a function based on said quantified data distribution characteristic and said quantified distributive characteristic of said aggregation function; and
- instructions for controlling said processor to select said function from a plurality of functions based on said weighting factor, wherein said function from said plurality of functions is used for distinguishing the presence of an exception.

27. A system for selecting a function for use in detecting a presence of an exception in multidimensional data, comprising:
- a module for quantifying a characteristic of said multidimensional data;
- a module for determining a weighting factor of a function based on said quantified characteristic; and
- a module for selecting said function from a plurality of functions based on said weighting factor;
- wherein said function is used for distinguishing the presence of an exception.

28. A system for selecting a function for use in detecting a presence of an exception in multidimensional data, comprising:
- a module for quantifying a data distribution characteristic of said multidimensional data;
- a module for quantifying a distributive characteristic of an aggregation function of said multidimensional data;
- a module for determining a weighting factor of a function based on said quantified data distribution characteristic and said quantified distributive characteristic of said aggregation function; and
- a module for selecting said function from a plurality of functions based on said weighting factor,
- wherein said function from said plurality of functions is used for distinguishing the presence of an exception.

* * * * *